July 19, 1966　　　B. L. HALLER ET AL　　　3,261,465
APPARATUS FOR DETECTING IMPROPERLY LIDDED CANS
Filed Aug. 19, 1963　　　　　　　　　　　　　3 Sheets-Sheet 1

INVENTORS
BELMONT L. HALLER,
KARL A. SCHIRMER
BY THEIR ATTORNEYS
HARRIS, KIECH, RUSSELL & KERN

July 19, 1966   B. L. HALLER ET AL   3,261,465
APPARATUS FOR DETECTING IMPROPERLY LIDDED CANS
Filed Aug. 19, 1963   3 Sheets-Sheet 2

FIG. 2.

INVENTORS
BELMONT L. HALLER,
KARL A. SCHIRMER
BY THEIR ATTORNEYS
HARRIS, KIECH, RUSSELL & KERN

July 19, 1966     B. L. HALLER ET AL     3,261,465
APPARATUS FOR DETECTING IMPROPERLY LIDDED CANS
Filed Aug. 19, 1963     3 Sheets-Sheet 3
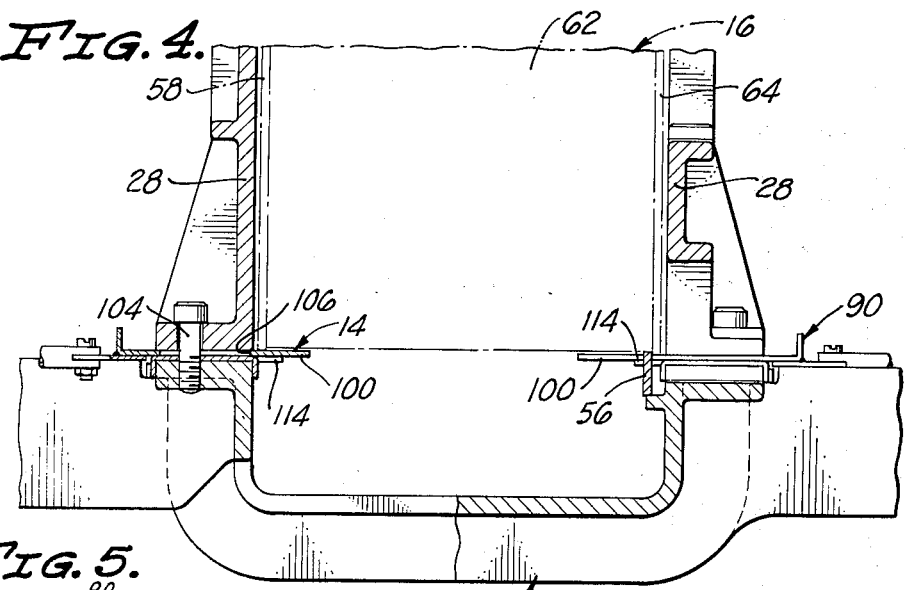
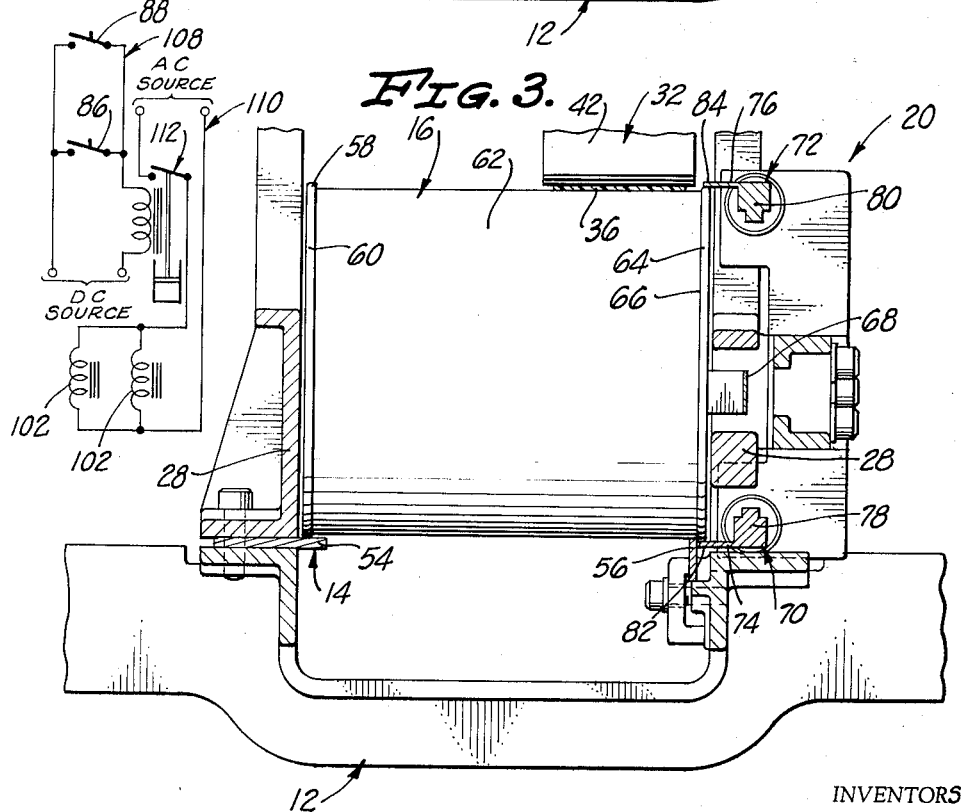
INVENTORS
BELMONT L. HALLER,
KARL A. SCHIRMER
BY THEIR ATTORNEYS
HARRIS, KIECH, RUSSELL & KERN

# United States Patent Office 3,261,465
Patented July 19, 1966

3,261,465
APPARATUS FOR DETECTING IMPROPERLY LIDDED CANS
Belmont L. Haller, Long Beach, and Karl A. Schirmer, Riverside, Calif., assignors to Hunt Foods and Industries, Inc., Fullerton, Calif., a corporation of Delaware
Filed Aug. 19, 1963, Ser. No. 302,832
11 Claims. (Cl. 209—88)

The present invention relates in general to detecting improper lidding of hermetically sealed cans, and a primary object of the invention is to provide an apparatus for automatically detecting and arresting or rejecting any defectively lidded cans discharged by conventional can lidding equipment.

For convenience, the invention will be considered herein in connection with an apparatus for detecting those cans which have had their final lids, usually their top lids, applied improperly after filling of the cans. However, it will be understood that the invention is also applicable to detecting cans which have had their initially-applied lids, usually their bottom lids, installed improperly.

Defectively or improperly lidded cans are of two principal types, one being commonly referred to as an "inside lipper" or "in lipper" and the other as an "outside lipper." In an in lipper, at least a portion of the flared end of the can body is bent inwardly so that it does not interlock properly with the lid rim. Conversely, in an out lipper, at least a portion of the flared end of the can body is turned outwardly too far to interlock with the lid rim.

In lippers characteristically have indentations in their can bodies adjacent the improperly lidded portions thereof. On the other hand, it is characteristic of out lippers that they bulge outwardly adjacent the defectively lidded portions of the peripheries thereof.

Expressing the preceding more generally, it is characteristic of improperly lidded cans of the foregoing types that, at one or more points on their peripheries, there is an abnormal deviation from a concentric relation between the rim of the lid and an annular zone of the can body adjacent the lid.

An important object of the invention is to provide an apparatus for detecting improperly lidded cans which involve sensing any such abnormal deviation from a concentric relation between the lid rim and an annular zone of the can body adjacent the lid, as the can is being rotated about its axis.

A more specific object in the foregoing connection is to provide an apparatus which involve rolling each can along a track which engages an annular zone of the can body adjacent the lid, and past detector means engageable with the rim of the lid for sensing any abnormal deviation from a concentric relation between the rim of the lid and the annular zone of the can body adjacent the lid.

Still more specifically, an object of the invention is to provide an apparatus for detecting improperly lidded cans, in a series of cans each of which includes a cylindrical can body provided at one end with a lid having a rim projecting radially outwardly beyond the can body, comprising: track means along which the cans are rollable in sequence; the track means including a track rollably engageable by the body of each can in an annular zone adjacent the lid thereon; means for guiding the cans along the track means in sequence with the body of each can in rolling engagement with the track in an annular zone adjacent the lid thereon; and detector means paralleling the track and engageable and displaceable by the lid rim of an improperly lidded can.

Another object is to provide an apparatus of the foregoing nature having means actuable by the detector means for removing from the track means any cans the lid rims of which have engaged and displaced the detector means.

A further object in the foregoing connection is to provide two spaced, parallel detector means paralleling the track and receiving the lid rims of successive cans therebetween and respectively engageable and displaceable by the lid rims of different types of improperly lidded cans, e.g., in lipper and out lipper types.

Yet another object is to provide a means for rejecting improperly lidded cans which includes trap door means in the line of and forming a continuation of the track means, and which includes means operable by the detector means for opening the trap door means, when any cans the lid rims of which have engaged and displaced the detector means reach the trap door means, so as to remove any such improperly lidded cans from the track means.

Still another object is to provide a trap door means which is downstream from the detector means, and to provide an actuating means, operable by the detector means, which includes time delay means for delaying the opening of the trap door means until any improperly lidded cans sensed by the detector means reach the trap door means.

An additional object is to provide a trap door means which comprises two trap doors laterally withdrawable from the line of the track means, the actuating means for the trap door means comprising means for laterally withdrawing the two trap doors from the line of the track means when a can is to be rejected reaches them.

A further object is to provide means engageable with each can for biasing same against the trap doors to forcibly eject such can upon lateral withdrawal of the trap doors from the line of the track means.

The foregoing objects, advantages, features and results of the present invention, together with various other objects, advantages, features and results thereof which will be evident to those skilled in the can art in the light of this disclosure, may be achieved with the exemplary embodiment of the invention described in detail hereinafter and illustrated in the accompanying drawings, in which:

FIG. 2 is a plan view of the apparatus;

Figure 1:
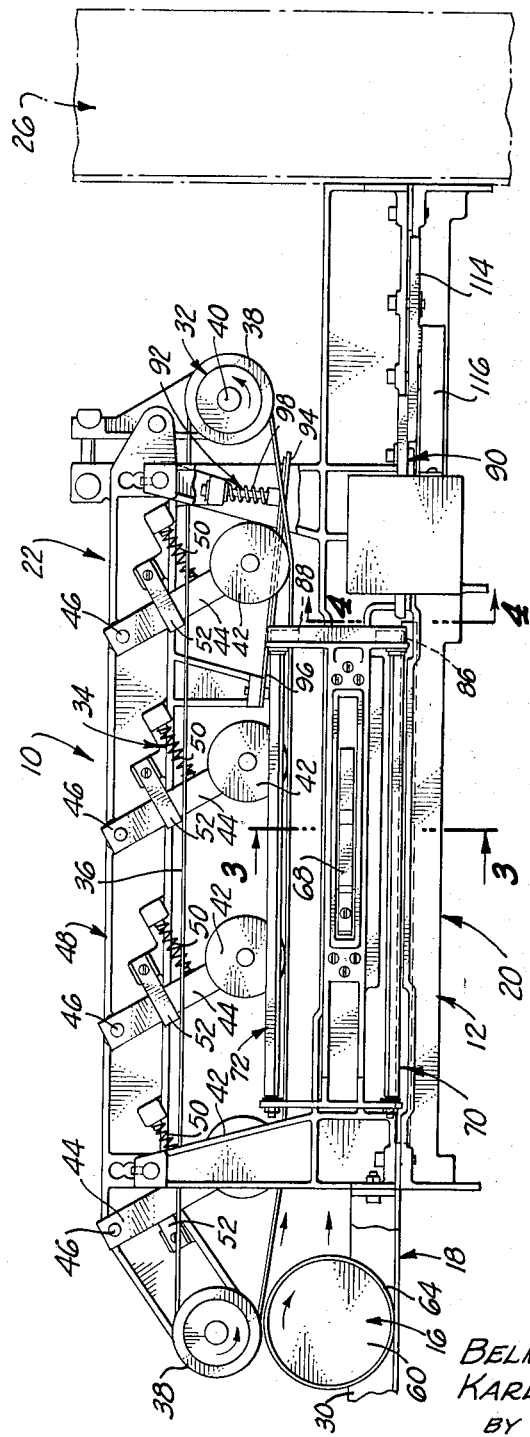
FIG. 1 is a side elevational view of a detecting and rejecting apparatus of the invention.

FIGS. 3 and 4 are enlarged, fragmentary sectional veiws respectively taken along the arrowed lines 3—3 and 4—4 of FIG. 1 and of FIG. 2; and FIG. 5 is a schematic wiring digram showing electrical circuitry incorporated in the apparatus.

In the drawings, the apparatus of the invention for detecting and rejecting improperly lidded cans is designated generally by the numeral 10. The apparatus 10 includes a frame, designated generally by the numeral 12, which carries track means 14 extending lengthwise of the frame. Cans 16 are adapted to roll, in sequence, onto the track means 14 of the apparatus 10 from an inlet track means 18 leading from suitable conventional lidding equipment, not shown, in which, for example, the final, upper lids are applied.

As the cans 16 roll along the track means 14 in sequence, they pass through a detecting station 20 in which any improperly lidded cans are detected. Such cans are rejected, in a rejecting station 22, by ejecting them downwardly from the track means 14 in a manner which will be described hereinafter. Properly lidded cans roll along the track means 14 through the rejecting station 22 and are received by a suitable takeaway conveyor 26. The cans 16 are guided along the track means 14 by laterally spaced guide walls 28, as best shown in FIGS. 3 and 4 of the drawings. Similar guide walls 30 guide the cans 16 along the inlet track means 18.

The cans 16 may be propelled along the inlet track means 18 by any suitable means, as by means of gravity. As they approach the apparatus 10, successive cans are engaged by a propelling means 32 which rolls them along the track means 14 through the detecting station 20 to the rejecting station 22, and through this station if they are properly lidded. The propelling means 32 is located above the track means 14 and, as will be clear from FIG. 2 of the drawings, is shown offset laterally to one side of the track means 14. This lateral offset of the propelling means 32 is in a direction such that the propelling means engages the series of cans 16 adjacent the lidded ends thereof which are to be inspected. With this lateral offset, a biasing means 34 associated with the propelling means 32 acts on the cans 16 to bias the lidded ends thereof which are to be inspected against the track means 14 in a positive manner.

Considering the propelling means 32 in more detail, it includes an endless belt 36 trained around pulleys 38 at its ends. The downstream pulley 38 is driven, as by a shaft 40, FIG. 2, in a direction to produce movement of the lower run of the belt 36 in the downstream direction.

Considering the biasing means 34 associated with the propelling means 32, the lower run of the belt 36 is trained over idler rollers 42 which are mounted on the lower ends of arms 44 pivotally connected at their upper ends, by pivots 46, to a superstructure 48 forming part of the frame 12. Compression springs 50 seated against the superstructure 48 and against the respective arms 44 bias the arms in directions such as to bias the idler rollers 42 downwardly against the lower run of the belt 36, thereby pressing the lower run of the belt firmly against the cans 16 propelled along the track means 14 by the lower run of the belt. As previously mentioned, the lower run of the belt 36 engages the cans 16 adjacent the lidded ends thereof which are to be inspected, thereby positively holding such can ends against the track means 14. Downward movement of the idler rollers 42 beyond predetermined lowermost positions is prevented by stops 52 engageable with the respective arms 44.

Considering the track means 14 in more detail, it includes, within the detecting station 20, spaced, parallel tracks 54 and 56 respectively engageable by the ends of the cans 16. More particularly, as best shown in FIG. 3 of the drawings, the track 54 may merely be a flat strip engageable with the normal radially-projecting rim 58 of the bottom lid 60 of each can 16. Thus, the lid rim 58 merely rolls along a relatively wide upper surface of the track 54.

An important feature of the invention resides in the fact that the track 56 has a relatively narrow upper surface which, as best shown in FIG. 3 of the drawings, engages the body 62 of each can 16 in a narrow annular zone immediately adjacent the radially-outwardly-projecting rim 64 of the lid 66 to be inspected, such lid being the top lid, for example. To insure engagement of the can body 62 with the relatively narrow track 56 immediately adjacent the lid rim 64, the adjacent guide wall 28 carries a leaf spring 68 which engages the lid 66 of each can and presses the rim 64 thereof against one side of the track 56. Thus, each can 16 is accurately positioned relative to the track 56 as it is rolled through the detecting station 20 by the propelling means 32.

The apparatus 10 includes two spaced, parallel detector means 70 and 72 between which the lid rims 64 of successive cans 16 pass and which respectively detect improperly lidded cans of the in lipper and out lipper types. As previously explained, it is characteristic of an in lipper that a portion of the can body 62 immediately adjacent the lid rim 64 will be indented, the reverse being true of an out lipper. Consequently, as a can 16 of the in lipper type rolls along the track 56, it will drop downwardly during at least a portion of a revolution to cause the lid rim 64 to actuate the detector means 70. Conversely, a defective can of the out lipper type will be elevated relative to the track 56 during at least a portion of a revolution to cause the lid rim 64 to actuate the detector means 72.

Considering the foregoing more generally, any lidding defect which results in an abnormal deviation from a concentric relationship between the lid rim 64 and the can body 62 immediately adjacent such lid rim results in actuation of one or the other of the detector means 70 and 72. It should be pointed out that the detector means 70 and 72 are so set that normal concentricity deviations, due to the presence of the usual longitudinal seams in the can bodies, do not actuate the detector means 70 and 72. In other words, the two detector means 70 and 72 are so set that only abnormal concentricity deviations due to defective lidding actuate the detector means.

The two detector means 70 and 72 respectively include vanes which extend longitudinally of the track means 14 throughout the detecting station 20 and which are of sufficient length to scan the entire lid-rim periphery of the largest can which the apparatus 10 is capable of handling. The vanes 74 and 76 are mounted on the frame 12 for pivotal movement about respective axes 78 and 80, FIG. 3, extending longitudinally of the track means 14 and spaced laterally from the line of the track means. The vanes 74 and 76 have free edges 82 and 84 which project laterally inwardly, as clearly shown in FIG. 3, to receive the lid rims 64 of successive cans 16 therebetween. It might be well to point out at this juncture that the cans 16 are fed to the apparatus 10 with a sufficient spacing therebetween that each can passes through the detecting station 20 before the next can enters it. In this fashion, the detector means 70 and 72 scan the entire lid-rim periphery of each can before beginning to scan the lid-rim periphery of the next can in the sequence.

Whenever an abnormal concentricity deviation between the lid rim 64 and the can body 62 thereadjacent is encountered, one or the other of the vanes 74 and 76 is pivoted sufficiently to actuate a corresponding switch 86 or 88, FIGS. 1 and 5, connected thereto. Actuation of either of these switches results in ejection of the corresponding can from the track means 14 in a manner which will now be described.

Forming a continuation of the track means 14 within the rejecting station 22 is a trap door means 90 which is opened, when an improperly lidded can sensed by either of the detector means 70 and 72 reaches the trap door means, to eject such improperly lidded can downwardly. To insure downward ejection of an improperly lidded can when the trap door means 90 opens, the apparatus 10 includes a biasing means 92 located above the trap door means 90 and engageable with each can 16 entering the rejecting station 22. As shown in FIG. 1 of the drawings, the biasing means 92 includes an ejecting plate 94 carried by a leaf spring 96 which is mounted on the superstructure 48 of the frame 12. Additional downward bias is applied to the ejecting plate 94 by a compression spring 98 acting between the ejecting plate 94 and the superstructure 48. The springs 96 and 98 apply a considerable downward force to each can 16 passing under the ejecting plate 94 to insure downward ejection of an improperly lidded can when the trap door means 90 opens in response to actuation by one or the other of the detector means 70 and 72 in a manner to be described.

In the particular construction illustrated, the trap door means 90 includes two laterally spaced trap doors 100 constituting part of the track means 14 and respectively constituting continuations of the tracks 54 and 56, being engageable by the lid rims 58 and 64, respectively. The two trap doors 100 are laterally withdrawable out of the line of the track means by means of solenoids 102 respectively connected thereto, each trap door being laterally guided by a guide pin 104 disposed in a guide slot 106 therein, as shown in FIG. 2 of the drawings. It will be noted that the inner edges of the trap doors 100 diverge in the downstream direction and that the trap doors are laterally withdrawable along paths perpendicular to such divergent inner edges. With this construction, more positive downward ejection of a defective can by the biasing or ejecting means 92 is achieved. In other words, even if a can to be ejected initially engages the upstream ends of the trap doors 100, it will be forced downwardly between the inner edges of the trap doors before it can pass through the rejecting station 22, due to the downstream divergence of the inner edges of the trap doors and the fact that they are laterally withdrawn along lines perpendicular to such edges.

The solenoids 102 constitute an actuating means operable by the detector means 70 and 72 for opening the trap door means 90 when any cans 16 the lid rims 68 of which have engaged and displaced either of the detector means 70 and 72, reach the trap door means. This actuating means also includes a time delay means for delaying the opening of the trap door means until improperly lidded cans, sensed by either of the detector means 70 and 72, reach the trap door means. The manner in which this is accomplished will now be considered in connection with FIG. 5 of the drawings.

Referring thereto, the switches 86 and 88 of the detector means 70 and 72 are shown as connected in parallel in a direct current sensing circuit 108. The two solenoids 102 are connected in parallel in an alternating current actuating circuit 110 which includes a dashpot-controlled, variable time delay relay 112 inductively coupled to the sensing circuit 108. The time delay provided by the relay 112 may be varied to provide the delay necessary to permit an improperly lidded can to reach the trap door means 90, prior to opening of the trap door means, for various can speeds through the apparatus 10.

As will be apparent, if either of the detector means 70 and 72 senses an improperly lidded can, the sensing circuit 108 is closed to close the actuating circuit 110 after an appropriate time delay. Upon closure of the actuating circuit by the time delay relay 112, both solenoids 102 are energized simultaneously to simultaneously withdraw the two trap doors 100 laterally from the line of the track means 14, thereby permitting the ejecting means 92 to eject the defectively lidded can downwardly into a suitable receptacle, conveyor, or the like, not shown.

Occasionally, an ejected can may not be displaced downwardly far enough to completely clear the trap doors 100 prior to reaching the downstream ends thereof. To prevent a jam up under such conditions, the track means 14 includes tracks 114, downstream from the trap doors 100, which are lightly spring loaded inwardly into operative positions by leaf springs 116. The upstream ends of the tracks 114 underlie the downstream ends of the trap doors 100 so that normal cans merely roll from the trap doors onto the tracks 114, and thence onto fixed tracks 118 leading to the takeaway conveyor 26. However, if an ejected can fails to clear the laterally withdrawn trap doors 100 by the time it reaches the tracks 114, the leaf springs 116 permit the latter to be displaced laterally outwardly to permit the ejected can to drop on through, thereby preventing a pile up.

*Operation*

The operation of the apparatus 10 will be apparent from the foregoing description so that only a brief summary thereof is required at this point.

Cans 16 entering the apparatus 10 in spaced sequence are rolled therethrough along the track means 14 by the propelling means 32 and are biased against the track means 14 by the biasing means 34 associated with the propelling means. The propelling means 32 and the biasing means 34 are laterally offset to the side of the apparatus corresponding to the can lids 66 to be inspected, thereby insuring that the can bodies 62 are firmly held against the track 56 adjacent the rims 64 of such lids.

Improperly lidded cams of the in lipper and out lipper types are respectively sensed by the detector means 70 and 72. After a suitable time delay, sufficient to permit each improperly lidded can to reach the trap door means 90, the solenoids 102 are energized to laterally withdraw the traps doors 100, thereby permitting the ejecting means 92 to eject the defective can downwardly from the track means 14. Properly lidded cans pass uninterruptedly through the rejecting station 22 to the takeaway conveyor 26.

Although an exemplary embodiment of the invention has been disclosed herein for purposes of illustration, it will be understood that various changes, modifications and substitutions may be incorporated in such embodiment without departing from the spirit of the invention as defined by the appended claims.

We claim:
1. In an apparatus for detecting improperly lidded cans in a series of cans each of which includes a cylindrical can body provided at one end with a lid having a rim projecting radially outwardly beyond the can body, the combination of:
   (a) track means along which the cans are rollable in sequence;
   (b) said track means including a stationary track rollably engageable by the body of each can in an annular zone adjacent the lid thereon;
   (c) means for guiding cans along said track means in sequence with the body of each can in rolling engagement with said track in an annular zone adjacent the lid thereon; and
   (d) movable detector means paralleling said track, laterally outwardly of said track means, and engageable and displaceable by the lid rim of an improperly lidded can.

2. In an apparatus for detecting and rejecting improperly lidded cans in a series of cans each of which includes a cylindrical can body provided at one end with a lid having a rim projecting radially outwardly beyond the can body, the combination of:
   (a) track means along which the cans are rollable in sequence;
   (b) said track means including a stationary track rollably engageable by the body of each can in an annular zone adjacent the lid thereon;
   (c) means for guiding cans along said track means in sequence with the body of each can in rolling engagement with said track in an annular zone adjacent the lid thereon;
   (d) movable detector means paralleling said track, laterally outwardly of said track means, and engageable and displaceable by the lid rim of an improperly lidded can; and
   (e) means actuable by said detector means for removing from said track means any cans the lid rims of which engage and displace said detector means.

3. In an apparatus for detecting and rejecting improperly lidded cans in a series of cans each of which includes a cylindrical can body provided at one end with a lid having a rim projecting radially outwardly beyond the can body, the combination of:
   (a) track means along which the cans are rollable in sequence;
   (b) said track means including a stationary track rollably engageable by the body of each can in an annular zone adjacent the lid thereon;
   (c) means for guiding cans along said track means in sequence with the body of each can in rolling engagement with said track in an annular zone adjacent the lid thereon;
   (d) means for rolling cans along said track means in sequence;
   (e) means for biasing the bodies of the cans into rolling engagement with said track;

(f) movable detector means paralleling said track, laterally outwardly of said track means, and engageable and displaceable by the lid rim of an improperly lidded can; and (g) means actuable by said detector means for removing from said track means any cans the lid rims of which engage and displace asid detector means.

4. In an apparatus for detecting and rejecting improperly lidded cans in a series of cans each of which includes a cylindrical can body provided at one end with a lid having a rim projecting radially outwardly beyond the can body, the combination of:

(a) track means along which the cans are rollable in sequence;

(b) said track means including a stationary track rollably engageable by the body of each can in an annular zone adjacent the lid thereon;

(c) means for guiding cans along said track means in sequence with the body of each can in rolling engagement with said track in an annular zone adjacent the lid thereon;

(d) endless belt means engageable with cans on said track means for rolling such cans along said track means in sequence;

(e) spring means engaging said endless belt means for biasing the bodies of the cans into rolling engagement with said track;

(f) movable detector means paralleling said track, laterally outwardly of said track means, and engageable and displaceable by the lid rim of an improperly lidded can; and (g) means actutable by said detector means for removing from said track means any cans the lid rims of which engage and displace said detector means.

5. In an apparatus for detecting and rejecting improperly lidded cans in a series of cans each of which includes a cylindrical can body provided at one end with a lid having a rim projecting radially outwardly beyond the can body, the combination of:

(a) track means along which the cans are rollable in sequence;

(b) said track means including a stationary track rollably engageable by the body of each can in an annular zone adjacent the lid thereon;

(c) means for guiding cans along said track means in sequence with the body of each can in rolling engagement with said track in an annular zone adjacent the lid thereon;

(d) means for rolling cans along said track means in sequence;

(e) means for biasing the bodies of the cans into rolling engagement with said track;

(f) two spaced, parallel, movable detector means paralleling said track, laterally outwardly of said track means, and receiving the lid rims of successive cans therebetween and respectively engageable and displaceable by the lid rims of different types of improperly lidded cans; and (g) means actuable by either of said detector means for removing from said track means any can the lid rim of which engages and displaces either of said detector means.

6. In an apparatus for detecting and rejecting improperly lidded cans in a series of cans each of which includes a cylindrical can body provided at one end with a lid having a rim projecting radially outwardly beyond the can body, the combination of:

(a) track means along which the cans are rollable in sequence;

(b) said track means including a stationary track rollably engageable by the body of each can in an annular zone adjacent the lid thereon;

(c) means for guiding cans along said track means in sequence with the body of each can in rolling engagement with said track in an annular zone adjacent the lid thereon;

(d) means for rolling cans along said track means in sequence;

(e) means for biasing the bodies of the cans into rolling engagement with said track;

(f) movable detector means paralleling said track, laterally outwardly of said track means, and engageable and displaceable by the lid rim of an improperly lidded can;

(g) trap door means in the line of said track means downstream from said detector means; and (h) means operable by said detector means for opening said trap door means, when any cans the lid rims of which have engaged and displaced said detector means reach said trap door means, so as to remove such cans from said track means.

7. In an apparatus for detecting and rejecting improperly lidded cans in a series of cans each of which includes a cylindrical can body provided at one end with a lid having a rim projecting radially outwardly beyond the can body, the combination of:

(a) track means along which the cans are rollable in sequence;

(b) said track means including a stationary track rollably engageable by the body of each can in an annular zone adjacent the lid thereon;

(c) means for guiding cans along said track means in sequence with the body of each can in rolling engagement with said track in an annular zone adjacent the lid thereon;

(d) means for rolling cans along said track means in sequence;

(e) means for biasing the bodies of the cans into rolling engagement with said track;

(f) movable detector means paralleling said track laterally outwardly of said track means, and engageable and displaceable by the lid rim of an improperly lidded can;

(g) trap door means in the line of said track means downstream from said detector means;

(h) means operable by said detector means for opening said trap door means, when any cans the lid rims of which have engaged and displaced said detector means reach said trap door means, so as to remove such cans from said track means; and (i) means engageable with each can for biasing same against said trap door means to eject such can upon opening of said trap door means.

8. In an apparatus for detecting and rejecting improperly lidded cans in a series of cans each of which includes a cylindrical can body provided at one end with a lid having a rim projecting radially outwardly beyond the can body, the combination of:

(a) track means along which the cans are rollable in sequence;

(b) said track means including a stationary track rollably engageable by the body of each can in an annular zone adjacent the lid thereon;

(c) means for guiding cans along said track means in sequence with the body of each can in rolling engagement with said track in an annular zone adjacent the lid thereon;

(d) means for rolling cans along said track means in sequence;

(e) means for biasing the bodies of the cans into rolling engagement with said track;

(f) two spaced, parallel, movable detector means paralleling said track, laterally outwardly of said track means, and receiving the lid rims of successive cans therebetween and respectively engageable and displaceable by the lid rims of different types of improperly lidded cans;

(g) trap door means in the line of said track means downstream from said detector means; and (h) means operable by either of said detector means for opening said trap door means, when any cans the lid rims of which have engaged and displaced either of said detector means reach said trap door means, so as to remove such cans from said track means.

9. In an apparatus for detecting and rejecting improperly lidded cans in a series of cans each of which includes a cylindrical can body provided at one end with a lid having a rim projecting radially outwardly beyond the can body, the combination of:
  (a) track means along which the cans are rollable in sequence;
  (b) said track means including a stationary track rollably engageable by the body of each can in an annular zone adjacent the lid thereon;
  (c) means for guiding cans along said track means in sequence with the body of each can in rolling engagement with said track in an annular zone adjacent the lid thereon;
  (d) means for rolling cans along said track means in sequence;
  (e) means for biasing the bodies of the cans into rolling engagement with said track;
  (f) movable detector means paralleling said track laterally outwardly of said track means, and engageable and displaceable by the lid rim of an improperly lidded can;
  (g) trap door means in the line of said track means downstream from said detector means;
  (h) actuating means operable by said detector means for opening said trap door means, when any cans the lid rims of which have engaged and displaced said detector means reach said trap door means, so as to remove such cans from said track means; and
  (i) said actuating means including time delay means for delaying the opening of said trap door means until any cans the lid rims of which have engaged and displaced said detector means reach said trap door means.

10. In an apparatus for detecting and rejecting improperly lidded cans in a series of cans each of which includes a cylindrical can body provided at one end with a lid having a rim projecting radially outwardly beyond the can body, the combination of:
  (a) track means along which the cans are rollable in sequence;
  (b) said track means including a stationary track rollably engageable by the body of each can in an annular zone adjacent the lid thereon;
  (c) means for guiding cans along said track means in sequence with the body of each can in rolling engagement with said track in an annular zone adjacent the lid thereon;
  (d) means for rolling cans along said track means in sequence;
  (e) means for biasing the bodies of the cans into rolling engagement with said track;
  (f) movable detector means paralleling said track laterally outwardly of said track means, and engageable and displaceable by the lid rim of an improperly lidded can;
  (g) trap door means forming a continuation of said track means downstream from said detector means and comprising two trap doors laterally withdrawable from the line of said track means;
  (h) actuating means operable by said detector means for laterally withdrawing said trap doors, when any cans the lid rims of which have engaged and displaced said detector means reach said trap doors, so as to remove such cans from said track means; and
  (i) said actuating means including time delay means for delaying the lateral withdrawal of said trap doors until any cans the lid rims of which have engaged and displaced said detector means reach said trap doors.

11. In an apparatus for detecting and rejecting improperly lidded cans in a series of cans each of which includes a cylindrical can body provided at one end with a lid having a rim projecting radially outwardly beyond the can body, the combination of:
  (a) track means along which the cans are rollable in sequence;
  (b) said track means including a stationary track rollably engageable by the body of each can in an annular zone adjacent the lid thereon;
  (c) means for guiding cans along said track means in sequence with the body of each can in rolling engagement with said track in an annular zone adjacent the lid thereon;
  (d) means for rolling cans along said track means in sequence;
  (e) means for biasing the bodies of the cans into rolling engagement with said track;
  (f) movable detector means paralleling said track, latererally outwardly of said track means, and engageable and displaceable by the lid rim of an improperly lidded can;
  (g) trap door means forming a continuation of said track means downstream from said detector means and comprising two trap doors laterally withdrawable from the line of said track means;
  (h) actuating means operable by said detector means for laterally withdrawing said trap doors, when any cans the lid rims of which have engaged and displaced said detector means reach said trap doors, so as to remove such cans from said track means;
  (i) said actuating means including time delay means for delaying the lateral withdrawal of said trap doors until any cans the lid rims of which have engaged and displaced said detector means reach said trap doors; and
  (j) means engageable with each can for biasing same against said trap doors to eject such can upon lateral withdrawl of said trap doors.

References Cited by the Examiner
UNITED STATES PATENTS

| | | | |
|---|---|---|---|
| 2,269,474 | 1/1942 | Nordquist | 209—74 X |
| 2,741,365 | 4/1956 | Box et al. | 209—81 |
| 3,133,639 | 5/1964 | Spier et al. | 209—88 |
| 3,153,485 | 10/1964 | West | 209—88 |

FOREIGN PATENTS 551,504  1/1958  Canada.

M. HENSON WOOD, JR., *Primary Examiner.*

ROBERT B. REEVES, *Examiner.*

R. A. SCHACHER, *Assistant Examiner.*